US012532122B2

(12) United States Patent
Ren et al.

(10) Patent No.: US 12,532,122 B2
(45) Date of Patent: Jan. 20, 2026

(54) SPEAKER DEVICE

(71) Applicant: AAC Microtech (Changzhou) Co., Ltd., Jiangsu (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 294 days.

(21) Appl. No.: 18/520,569

(22) Filed: Nov. 28, 2023

(65) Prior Publication Data

US 2025/0126410 A1 Apr. 17, 2025

Related U.S. Application Data

(63) Continuation of application No. PCT/CN2023/124349, filed on Oct. 12, 2023.

(51) Int. Cl.

*H04R 9/02* (2006.01)
*H04R 7/12* (2006.01)
*H04R 7/18* (2006.01)
*H04R 9/06* (2006.01)

(52) U.S. Cl.

CPC ............ *H04R 9/025* (2013.01); *H04R 7/127* (2013.01); *H04R 7/18* (2013.01); *H04R 9/063* (2013.01); *H04R 2400/11* (2013.01)

(58) Field of Classification Search

CPC .......... H04R 9/025; H04R 7/127; H04R 7/18; H04R 9/063; H04R 2400/11; H04R 1/24; H04R 9/043; H04R 9/045; H04R 9/06

See application file for complete search history.

(56) References Cited

U.S. PATENT DOCUMENTS

2013/0011000 A1* 1/2013 Xi .......................... H04R 9/025 381/412
2015/0139479 A1* 5/2015 Lai .......................... H04R 9/025 381/412
2024/0073612 A1* 2/2024 Ren .......................... H04R 7/18
2024/0073620 A1* 2/2024 Ren .......................... H04R 9/06

* cited by examiner

*Primary Examiner* — Mark Fischer
(74) *Attorney, Agent, or Firm* — Wiersch Law Group

(57) ABSTRACT

Provided is a speaker device, including a first frame, a first vibration system, a magnetic circuit system, a second frame, a second vibration system, a second voice coil, and a conductive member. The magnetic circuit system includes a lower splint, a first main magnetic steel, a first sub-magnet steel, a first pole core, a second sub-magnetic steel, and an upper splint. The conductive member includes an external conductive disk, two extension wall, and two connecting walls formed by bending and extending the two extension walls and spaced apart from each other. The connecting walls are used to act as welding pads, and a positive terminal and a negative terminal of the second voice coil are electrically connected to the two connecting walls, respectively. Compared with the related art, the acoustic performance of the speaker device of the present application is superior.

10 Claims, 11 Drawing Sheets

A-A

B-B

D-D

F-F

SPEAKER DEVICE

CROSS-REFERENCE TO RELATED APPLICATIONS

This application is a continuation of International Application No. PCT/CN2023/125349, filed Oct. 12, 2023, the entire contents of which are incorporated herein by reference.

TECHNICAL FIELD

The present application relates to the field of electroacoustic conversion, in particular to a speaker device.

BACKGROUND

The speaker device is a transducer that converts electrical signals into sound signals. It is primarily categorized into two modes: the single vibration system and the dual vibration system. In the dual vibration system mode, the speaker device includes a first vibration system fixed to a frame for producing low-frequency sounds and a second vibration system fixed to the magnetic circuit for producing high-frequency sounds.

In the speaker device with the dual vibration system mode in the related art, since the second vibration system is fixedly supported in a central region of the magnetic circuit, which cannot be directly connected to the frame, its voice coil cannot be connected to the external circuit board through the conductive members arranged on the frame. Therefore, in the speaker device of the related art, a through-hole that traverses the entire magnetic circuit system is provided at the bottom of the magnetic circuit system, and the conductive member is then inserted through this through-hole to extend beneath the second vibration system, so as to introduce electrical signals to the voice coil of the second vibration system. However, in the related art, the introduction of the through-hole reduces the overall structural integrity of the magnetic circuit system, and the magnetic steel and the pole core are spaced apart to form the magnetic gap, leading to a decrease in the overall magnetic potential of the system, i.e., the driving force is weakened, resulting in a decrease in the acoustic performance of the speaker device.

Therefore, it is necessary to provide a new speaker device to solve the above technical problem.

SUMMARY

An object of the present application is to provide a speaker device with better acoustic performance in dual vibration system mode.

In order to achieve the above object, the present application provides a speaker device, comprising:

- a first frame;
- a first vibration system, comprising:
  - a first diaphragm fixed at its outer periphery to the first frame; and
  - a first voice coil configured to drive the first diaphragm to vibrate for sound production;
- a magnetic circuit system, fixed to the first frame, wherein a side of which close to the first vibration system is provided with a first magnetic gap and a second magnetic gap; the first magnetic is arranged around the second magnetic gap, and the first voice coil is inserted and suspended in the first magnetic gap;

- a second frame, fixed to a top of the magnetic circuit system;
- a second vibration system, comprising:
  - a second diaphragm fixed at its outer periphery to a side of the second frame away from the magnetic circuit system; and
  - a second voice coil configured to drive the second diaphragm to vibrate for sound production, which is inserted and suspended in the second magnetic gap;
- a conductive member, extended from a bottom of the magnetic circuit system through the magnetic circuit system toward a bottom of the second diaphragm, and electrically connected to the second voice coil;
- wherein the magnetic circuit system comprises:
  - a lower splint, provided with a first through-hole, wherein the first through-hole is arranged through the lower splint;
  - a first main magnetic steel, fixedly stacked on the lower splint, and provided with two second through-holes, wherein the two second through-holes are both arranged through the first main magnetic steel;
  - a first sub-magnetic steel, fixedly stacked on the lower splint, wherein the first sub-magnetic steel is arranged around the first main magnetic steel and spaced apart from the first main magnetic steel to form the first magnetic gap;
  - a first pole core, fixedly stacked on the first main magnetic steel;
  - a magnet portion, fixedly stacked on the first pole core or the first main magnetic steel; wherein the conductive member is connected to the second voice coil through the first pole core and the magnet portion;
  - a second sub-magnetic steel, fixedly stacked on the first pole core, wherein the second sub-magnetic steel is arranged around the magnet portion and spaced apart from the magnet portion to form the second magnetic gap; the second frame is fixedly supported on a top of the second sub-magnetic steel; and
  - an upper splint, fixedly stacked on the first sub-magnetic steel and fixedly connected to the first frame;
- wherein the conductive member comprises: an external conductive disk abutted against a bottom of the first main magnetic steel, two extension walls extended from opposite ends of the external conductive disk and passed through the two second through-holes, the first pole core, and the magnet portion in sequence, and two connecting walls formed by bending and extending the two extension walls; wherein the two connecting walls are used to act as welding pads, and a positive terminal and a negative terminal of the second voice coil are electrically connected to the two connecting walls, respectively.

In one embodiment, the first pole core comprises a first pole core body fixedly stacked on the first main magnetic steel and a third through-hole arranged through the first pole core, wherein the two second through-holes are located within the third through-hole;

- the magnet portion is provided with two fourth through-holes, wherein the two fourth through-holes are arranged through the magnet portion, and the two fourth through-holes are connected to the two second through-holes, respectively;
- the magnet portion comprises a second main magnetic steel and a second pole core fixedly stacked on the second main magnetic steel; wherein the second main magnetic steel is located in the third through-hole and fixedly stacked on a side of the first main magnetic steel close to the second vibration system, and the two fourth through-holes are arranged through the second pole core and the second main magnetic steel in sequence.

In one embodiment, the first pole core comprises a first pole core body fixedly stacked on the first main magnetic steel and two third through-holes arranged through the first pole core body;

the magnet portion is fixedly stacked on the first pole core body, the magnet portion is provided with two fourth through-holes, wherein the two fourth through-holes are arranged through the magnet portion; the two fourth through-holes are connected to the two third through-holes, respectively; and the two third through-holes are connected to the two second through-holes, respectively;

the two fourth through-holes are arranged orthogonally to the two third through-holes, respectively; and the two second through-holes are arranged orthogonally to the two fourth through-holes, respectively; the orthogonal projections of the two second through-holes, the two third through-holes, and the two fourth through-holes along a vibration direction of the second diaphragm toward the lower splint are all located entirely within the first through-hole.

In one embodiment, the magnet portion comprises a second main magnetic steel fixedly stacked on the first pole core body and a second pole core fixedly stacked on the second main magnetic steel; and the two fourth through-holes are arranged through the second pole core and the second main magnetic steel in sequence.

In one embodiment, the magnet portion comprises an iron core fixedly stacked on the first pole core body, wherein the fourth through-hole are arranged through the iron core.

In one embodiment, the first diaphragm comprises:

a first folding ring in the shape of an annulus;

a second folding ring in the shape of an annulus, which is spaced apart from the first folding ring and arranged on an inner side of the first folding ring; and a first vibration portion in the shape of an annulus, which is formed by bending and extending an inner periphery of the first folding ring to connect to an outer periphery of the second folding ring;

wherein an outer periphery of the first folding ring is fixed to the first frame; an inner periphery of the second folding ring is fixed to a side of the second sub-magnetic steel away from the first main magnetic steel; and the first voice coil is fixed to a side of the first vibration portion close to the magnetic circuit system; the inner periphery of the second folding ring is fixed between the second frame and the second sub-magnetic steel.

In one embodiment, the first vibration system further comprises a first skeleton and an elastic support assembly, wherein the first skeleton comprises a skeleton body in the shape of an annulus for acting as the first vibration portion and a skeleton connecting portion formed by downwardly bent and extended from an outer periphery of the skeleton body; wherein one end of the elastic support assembly is fixed to the first frame, and the other end of the elastic support assembly is fixed to the skeleton connecting portion.

In one embodiment, the elastic support assembly comprises a first fixing arm fixed to the first frame, a second fixing arm spaced opposite the first fixing arm, and a spring arm connecting the first fixing arm to the second fixing arm, wherein the second fixing arm is fixed to the skeleton connecting portion.

In one embodiment, the second diaphragm comprises a second vibration portion, a third folded ring formed by extending outwardly from an outer periphery of the second vibration portion and in the shape of an annulus, and a dome covered on the second vibration portion, wherein an outer periphery of the third folded ring is fixed to a side of the second frame away from the second sub-magnetic steel, and the second voice coil is fixed to the second vibration portion.

In one embodiment, the second diaphragm further comprises an auxiliary dome in the shape of an annulus and fixed to a side of the second vibration portion close to the magnetic circuit system; wherein the auxiliary dome is located on a side of the second vibration portion away from the magnetic circuit system, and the second voice coil is fixed to a side of the auxiliary dome close to the magnetic circuit system.

In one embodiment, the speaker device further comprises a dust cover, wherein the dust cover comprises a cover body in the shape of an annulus and fixed to a periphery of the lower splint, a cover wall formed by bending and extending from opposite sides of the cover body, and a plurality of air holes arranged through the cover wall, wherein the cover wall is fixedly connected to the first frame.

Compared with the related art, in the speaker device of the present application, the lower splint of the magnetic circuit system is equipped with a first through-hole; two second through-holes are arranged through the first main magnetic steel. The first pole core includes a first core body fixedly stacked on the first main magnetic steel and a third through-hole arranged through the first core body, in which the two second through-holes are located in the third through-hole. Two fourth through-holes are arranged through the magnet portion, and the two fourth through-holes are connected to the two second through-holes, respectively. The upper splint is fixedly stacked on the first sub-magnetic steel and fixedly connected to the first frame. The conductive member includes an external conductive disk abutted against the bottom of the first main magnetic steel, two extension walls extended from opposite ends of the external conductive disk and passed through the two second through-holes, the first pole core, and the magnet portion in sequence, and two connecting walls formed by bending and extending the two extension walls; wherein the two connecting walls are used to act as welding pads, and a positive terminal and a negative terminal of the second voice coil are electrically connected to the two connecting walls, respectively. Therefore, the conductive member can pass through the first through-hole, the second through-holes, the first pole core, and the magnet portion from the bottom of the magnetic circuit system to reach the underside of the second diaphragm used for generating high-frequency sounds, realizing the purpose of power supply for the second voice coil, and efficiently adjusting a winding process of the second voice coil for controlling the total extension length of the voice coil wires at the two ends, so as to achieve amplitude adjustment of the second amplitude adjustment of the vibration system. Besides, although the conductive member is also extended from the bottom of the magnetic circuit system towards the top, a middle portion of the first main magnetic steel does not have to be hollowed out as a whole to give way to the conductive member, but rather through the arrangement of two second through-holes to enable the conductive member to pass through, so that the first main magnetic steel is partially retained between the second through-holes, and the size of the volume of the first main magnetic steel is increased as much as possible, thereby effectively improving the magnetic potential of the magnetic circuit system.

Besides, the magnet portion is a whole without having to be hollowed out, and the conductive member is arranged through the magnet portion, the loss of magnetic lines of force is reduced to a great extent, thus jointly making the acoustic performance of the speaker device better.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Embodiment One

Figure 1:
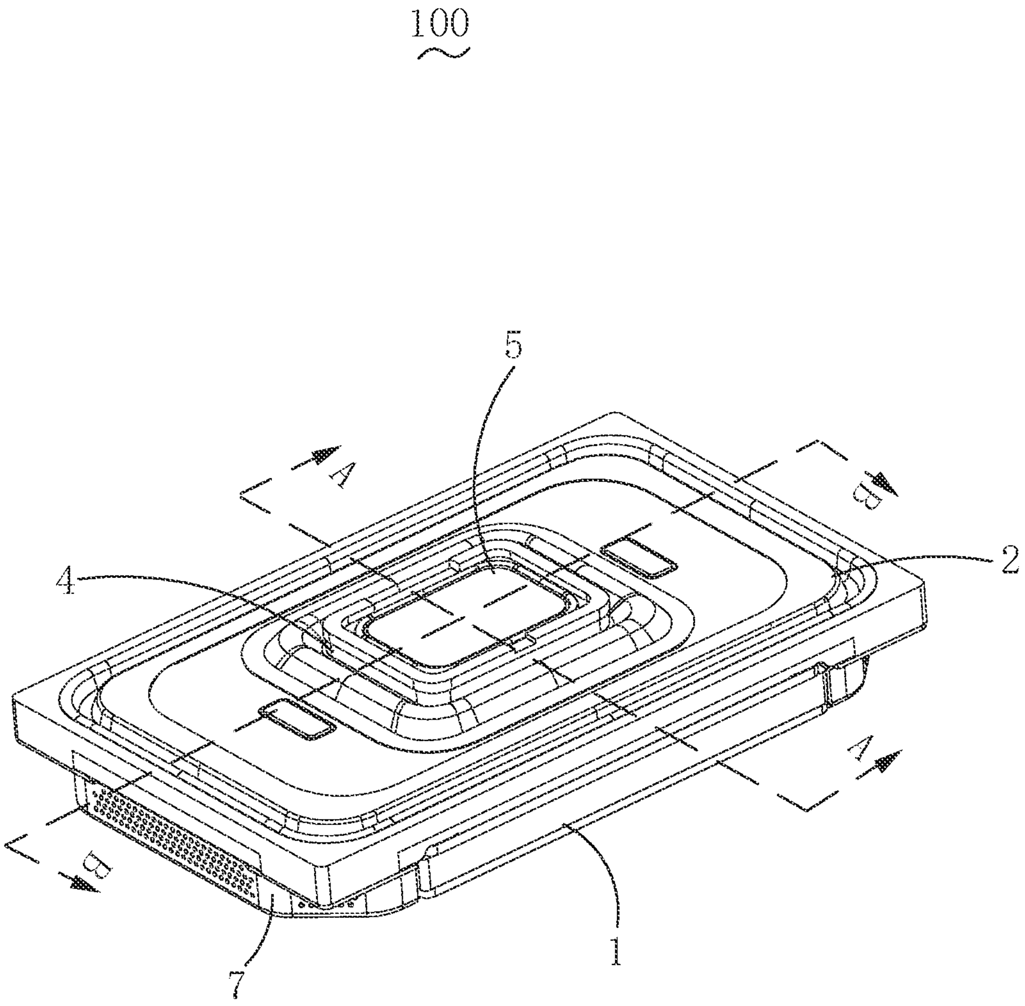
FIG. 1 shows a three-dimensional structural diagram of a speaker device according to Embodiment One of the present application.
Figure 2:
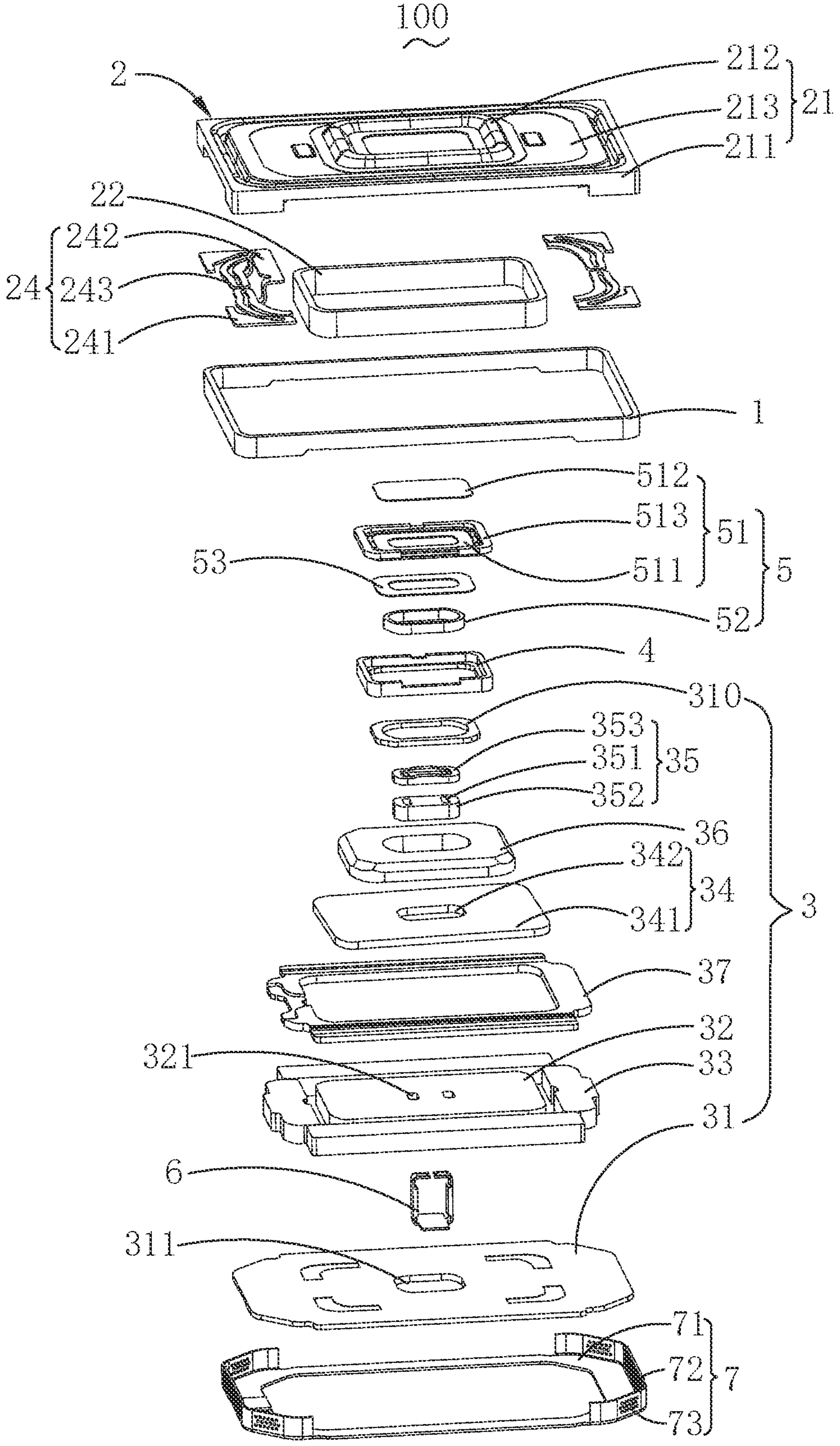
FIG. 2 shows a three-dimensional exploded view of the speaker device according to Embodiment 1 of the present application.
Figure 3:
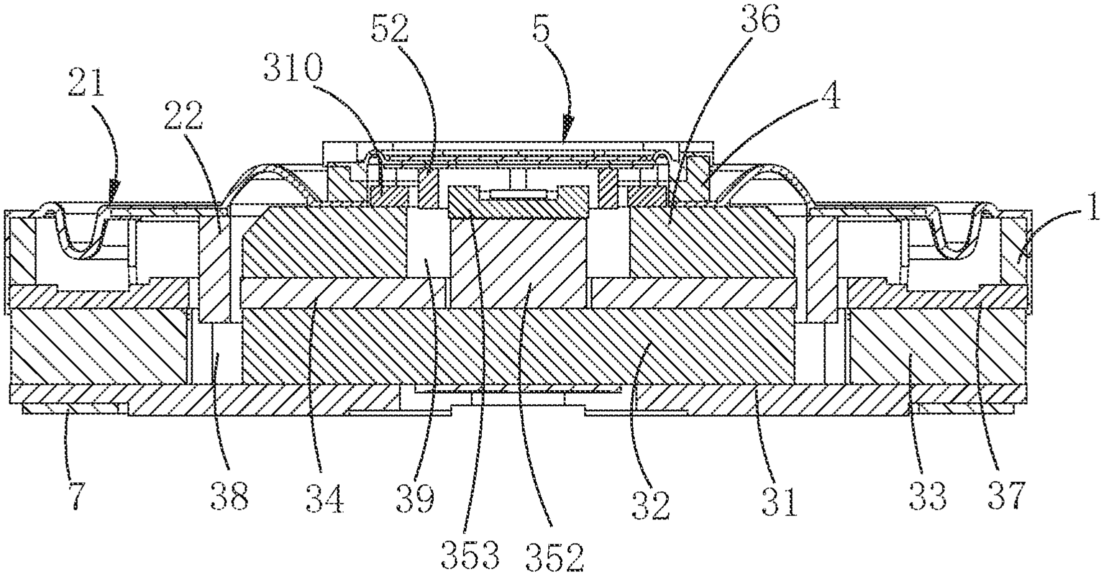
FIG. 3 shows a sectional view of line A-A in FIG. 1.
Figure 4:
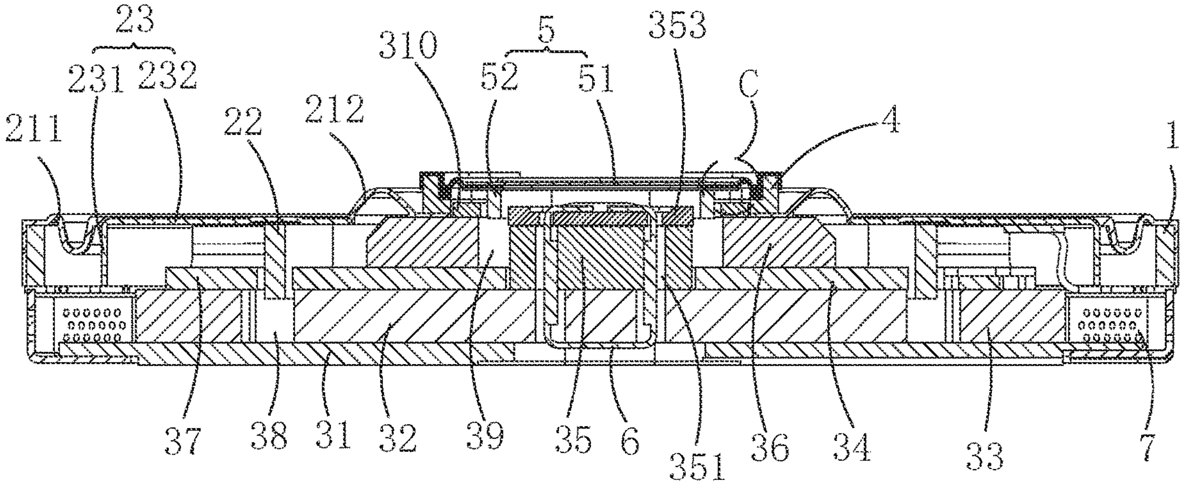
FIG. 4 shows a sectional view of line B-B in FIG. 1.
Figure 5:
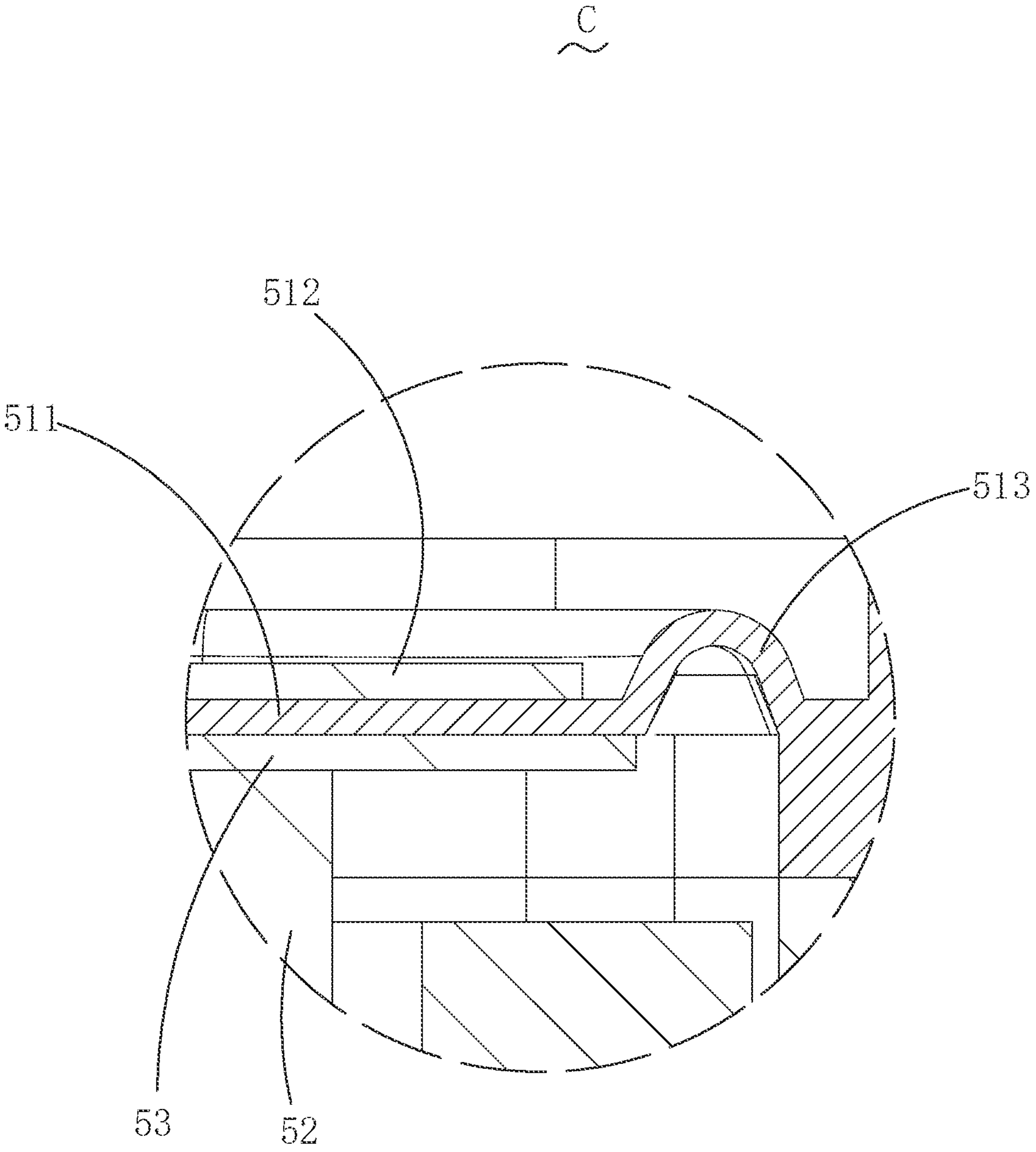
FIG. 5 shows a partially enlarged view of C in FIG. 5.
Figure 6:
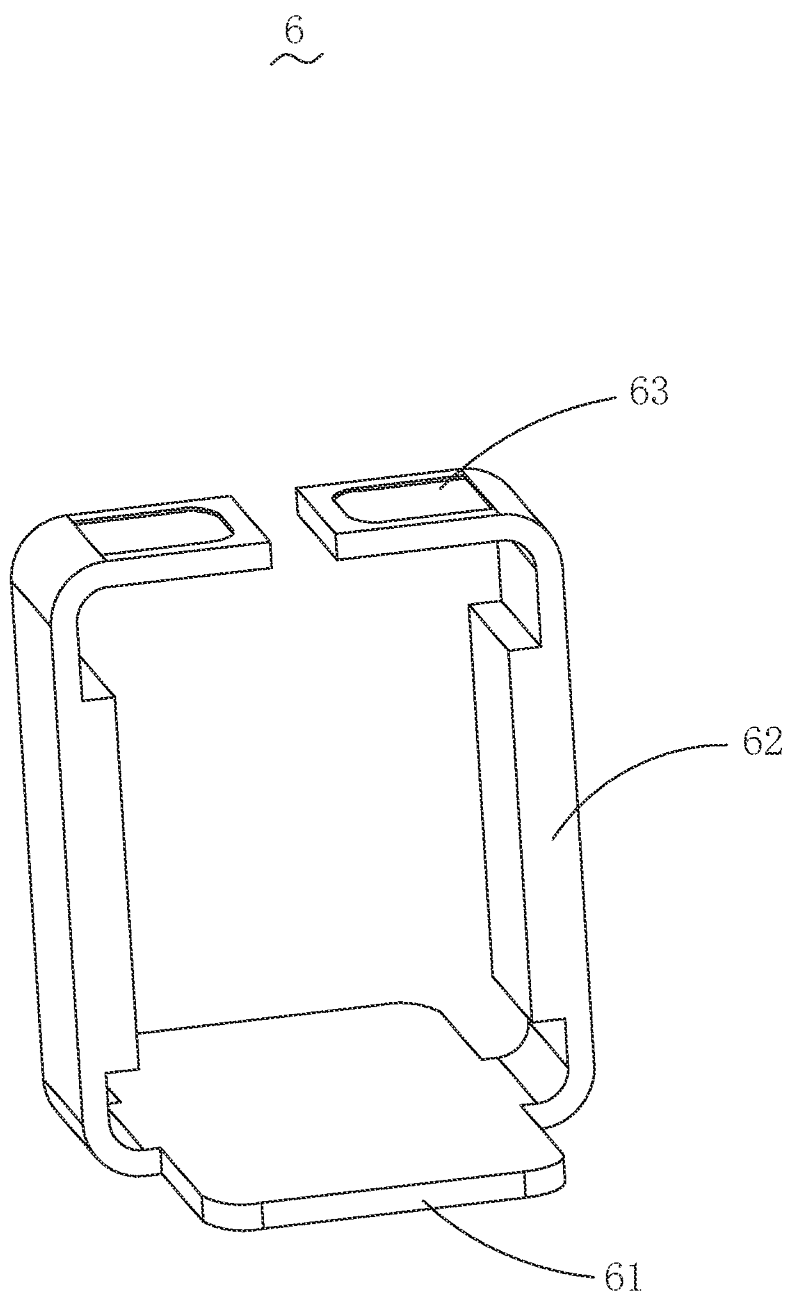
FIG. 6 shows a structural diagram of a conducive member according to an embodiment of the present application.

Combined with FIGS. 1 to 6, embodiments of the present application provide a speaker device 100, including a first frame 1, a first vibration system 2, a magnetic circuit system 3, a second frame 4, a second vibration system 5, and a conductive member 6.

The first frame 1 is configured to fixedly support the first vibration system 2 and the magnetic circuit system 3. In this embodiment, the first frame 1 is a ring-like structure surrounded by metal sheets.

The first vibration system 2 includes a first diaphragm 21 fixed at its outer periphery to the first frame 1, and a first voice coil 22 configured to drive the first diaphragm 21 to vibrate for sound production. The first diaphragm 21 is configured to generate low-frequency sounds.

The magnetic circuit system 3 is fixed to the first frame 1, and the magnetic circuit system 3 is provided with a first magnetic gap 38 and a second magnetic gap 39 on a side close to the first vibration system 2. The first magnetic gap 38 is arranged around the second magnetic gap 39, and the first voice coil 22 is inserted and suspended in the first magnetic gap 38.

The second frame 4 is fixed to the top of the magnetic circuit system 3. In this embodiment, the second frame 4 is a ring-like structure surrounded by metal sheets.

The second vibration system 5 includes a second diaphragm 51 fixed to a side of the second frame 4 away from the magnetic circuit system 3 at its outer periphery and a second voice coil 52 configured to drive the second diaphragm 51 to vibrate for sound production. The second voice coil 52 is inserted and suspended above the second magnetic gap 39. The second diaphragm 51 is configured to produce high-frequency sound. The first vibration system 2 and the second vibration system 5 share the magnetic circuit system 3, and are driven by the magnetic circuit system 3 to produce sounds in different frequency bands, respectively.

The conductive member 6 is extended from a bottom of the magnetic circuit system 3 through the magnetic circuit system 3 to a bottom of the second diaphragm 51, and is electrically connected to the second voice coil 52.

In this embodiment, the magnetic circuit system 3 includes a lower splint 31, a first main magnetic steel 32, a first sub-magnetic steel 33, a first pole core 34, a magnet portion 35, a second sub-magnetic steel 36, an upper splint 37, and a magnetic guide plate 312.

The lower splint 31 is provided with a first through-hole 311, and the first through-hole 311 is arranged through the lower splint 31.

The first main magnetic steel 32 is fixedly stacked on the lower splint 31, and the first main magnetic steel 32 is provided with two second through-holes 321 arranged through it. Since the first main magnetic steel 32 is not hollowed out in its center for giving way, but rather a portion of the first main magnetic steel 32 between the two second through-holes 321 is retained through the provision of the two second through-holes 321, which greatly retains the overall effective volume of the first main magnetic steel 32 and can provide a larger magnetic field performance, thereby greatly preserving the overall effective volume of the first main magnet 32 and providing greater magnetic field performance.

The first sub-magnetic steel 33 is fixedly stacked on the lower splint 31, and the first sub-magnetic steel 33 is arranged around the first main magnetic steel 32 and spaced from the first main magnetic steel 32 to form the first magnetic gap 38.

The first pole core 34 is fixedly stacked on the first main magnetic steel 32.

In this embodiment, the first pole core 34 includes a first pole core body 341 fixedly stacked on the first main magnetic steel 32 and a third through-hole 342 through the first pole core body 341. Both the second through-holes 321 are located within the third through-hole 342. The first pole core 34 is configured to conduct magnetism to the first main magnetic steel 32, and the first pole core 34 is covered on the first main magnetic steel 32 to reduce the loss of magnetism generated by the first main magnetic steel 32, thereby improving the magnetic field performance. The third through-hole 342, so that the conductive member 6 is extended to the second voice coil 52 through the third through-holes 342, to realize the electrical connection.

The magnet portion 35 is fixedly stacked on the first pole core 34 or the first main magnetic steel 32. The conductive member 6 is connected to the second voice coil 52 through the first pole core 34 and the magnet portion 35.

In this embodiment, the magnet portion 35 is located in the third through-hole 342 and is fixedly stacked on a side of the first main magnetic steel 32 close to the second vibration system 5. The magnet portion 35 is provided with two fourth through-holes 351, where the two fourth through-holes 351 are arranged through the magnet portion 35. Two of the fourth through-holes 351 are connected to two of the second through-holes 321, respectively. The magnet portion 35 is in one piece without having to be hollowed out, and the two fourth through-holes 351 provided on the magnet portion 35 allow the conductive member 6 to pass through, so that a part of the magnet portion 35 between the two fourth through-holes 351 is retained, which greatly reduces the loss of the magnetic lines, thus collectively resulting in a better acoustic performance of the speaker device 100.

In this embodiment, the magnet portion 35 includes a second main magnetic steel 352 and a second pole core 353 fixedly stacked on the second main magnetic steel 352. The second main magnetic steel 352 is located in the third through-hole 342 and fixedly stacked on a side of the first main magnetic steel 32 close to the second vibration system 5, and the two fourth through-holes 351 are arranged through the second pole core 353 and the second main magnetic steel 352 in sequence.

The second sub-magnetic steel 36 is fixedly stacked on the first core body 341, and the second sub-magnetic steel 36 is arranged around the magnet portion 35 and spaced apart from the magnet portion 35 to form the second magnetic gap 39. The second frame 4 is fixedly supported on the top of the second sub-magnetic steel 36.

The upper splint 37 is fixedly stacked on the first sub-magnetic steel 33 and is fixedly connected to the first frame 1.

The magnetic guide plate 312 is fixedly stacked on the second sub-magnetic steel 36 and fixedly connected to an inner periphery of the second frame 4.

In this embodiment, the conductive member 6 includes an external conductive disk 61 abutted against the bottom of the first main magnetic steel 32, two extension walls 62 which are bent and extended from opposite ends of the external conductive disk 61 and passed through the two second through-holes 321, the first pole core 34 and the magnet portion 35 in sequence, and two extension walls 62 which are formed by bending and extending the two extension walls. The two extension walls 62 are fixed to a top of the magnet portion 35 and spaced apart from each other. The two connecting walls 63 are used to act as welding pads, and a positive terminal and a negative terminal of the second voice coil 52 are electrically connected to the two connecting walls 63, respectively. An external power supply is connected through the external conductive disk 61, and the external power supply transmits the electrical energy towards the extension walls 62 and the connecting walls 63. A positive terminal and a negative terminal of the second voice coil 52 are electrically connected to the two connecting walls 63, respectively, thereby supplying the electrical energy to the second voice coil 52, and driving the second diaphragm 51 to vibrate for sound production.

In an embodiment, the conductive member 6 is formed by bending a strip-shaped conductive structure, such as a flexible circuit board, and such that both ends of the conductive member 6 are fixed to the top of the magnet portion 35 from the bottom of the magnetic circuit system 3 by passing through the first through-hole 311, the two second through-holes 321 and two fourth through-holes 351 in sequence, and electrically connected to the second voice coil 52.

In this embodiment, the first diaphragm 21 includes a first folding ring 211 in the shape of an annulus, a second folding ring 212 in the shape of an annulus spaced apart from the first folding ring and arranged on an inner side of the first folding ring 211, and a first vibration portion 213 in the shape of an annulus, which is formed by bending and extending an inner periphery of the first folding ring 211 to connect to an outer periphery of the second folding ring 212. An outer periphery of the first folding ring 211 is fixed to the first frame 1, and an inner periphery of the second folding ring 212 is fixed to a side of the second sub-magnetic steel 36 away from the first main magnetic steel 32. The first voice coil 22 is fixed to a side of the first vibration portion 213 close to the magnetic circuit system 3. The first vibration portion 213 is configured to drive the first voice coil 22 to vibrate, and the first vibration portion 213 is connected to the first folding ring 211 and the second folding ring 212, so as to improve the acoustic performance of the first diaphragm 21.

In this embodiment, the inner periphery of the second folding ring 212 is fixed between the second frame 4 and the second sub-magnetic steel 36, thereby increasing the fixation performance of the inner periphery of the second folded ring 212.

In this embodiment, the first vibration system 2 further includes a first skeleton 23 and an elastic support assembly 24. The first skeleton 23 includes a skeleton body 232 in the shape of an annulus for acting as the first vibration portion 213, and a skeleton connecting portion 231 formed by downwardly bent and extended from an outer periphery of the skeleton body 232. One end of the elastic support assembly 24 is fixed to the first potting frame 1, and the other end of the elastic support assembly 24 is fixed to the skeleton connecting portion 231.

The first skeleton 23 is configured to improve the fixation performance of the first diaphragm 21, and facilitate the arrangement and fixation of the first voice coil 22, so that the first voice coil 22 is suspended within the first magnetic gap 38, and the first voice coil 22 is well stabilized during the vibration of the first diaphragm 21. The elastic support assembly 24 is configured to increase the vibration strength of the first diaphragm 21, so as to improve the sound loudness and sensitivity, and further to prevent the first voice coil 22 from generating transverse oscillation during vibration, thereby improving reliability.

In this embodiment, the elastic support assembly 24 includes a first fixing arm 241 fixed to the first frame 1, a second fixing arm 242 spaced opposite to the first fixing arm 241, and an elastic arm 243 connecting the first fixing arm 241 to the second fixing arm 242. The second fixing arm 242 is fixed to the skeleton connecting portion 231.

In an embodiment, the elastic support assembly 24 is a flexible circuit board. The first voice coil 22 may be electrically connected to the flexible circuit board, so that the elastic support assembly 24 may also be configured to introduce an electrical signal to the first voice coil 22, avoiding breakage of wires by means of a lead wire, and improving its reliability. The flexible support assembly 24 may be directly connected to the first voice coil 22, or may be indirectly connected to the first voice coil 22 through the first skeleton 23.

In this embodiment, the second diaphragm 51 includes a second vibration portion 511, a third folded ring 513 formed by extending outwardly from an outer periphery of the second vibration portion 511 and in the shape of an annulus, and a dome 512 covered on the second vibration portion 511. An outer periphery of the third folded ring 513 is fixed to a side of the second frame 4 away from the second sub-magnetic steel 36, and the second voice coil 52 is fixed to the second vibration section 511. The conductive member 6 is connected to the external power supply to drive the second voice coil 52 to drive the second vibration portion 511 to vibrate, to enhance the vibration performance of the second diaphragm 51 by means of the third folding ring 513, thereby enhancing the vibration performance of the second vibration system 5, and improving the acoustic performance of the speaker device 100.

In this embodiment, the second diaphragm 51 further includes an auxiliary dome 53 in the shape of an annulus and fixed on the side of the second vibration portion 511 close to the magnetic circuit system 3. The dome 512 is located on a side of the second vibration portion 511 away from the magnetic circuit system 3, and the second voice coil 52 is fixed on the side of the auxiliary dome 53 close to the magnetic circuit system 3. The provision of the auxiliary dome 53 allows the second voice coil 52 to be inserted more into the second magnetic gap 39, thereby improving the vibration performance of the second diaphragm 51 in the vibration process.

In this embodiment, the speaker device 100 further includes a dust cover 7, which includes a cover body 71 in the shape of an annulus and fixed to a periphery of the lower splint 31, a cover wall 72 formed by bending and extending from the opposite sides of the cover body 71, and a plurality of air holes 73 arranged through the cover wall 72. The cover wall 72 is fixedly connected to the first frame 1. The cover wall 72 may be located at any of the positions of the four corners, the position of the long-axis side and the position of the short-axis side of the lower splint 31.

Embodiment Two

Figure 7:
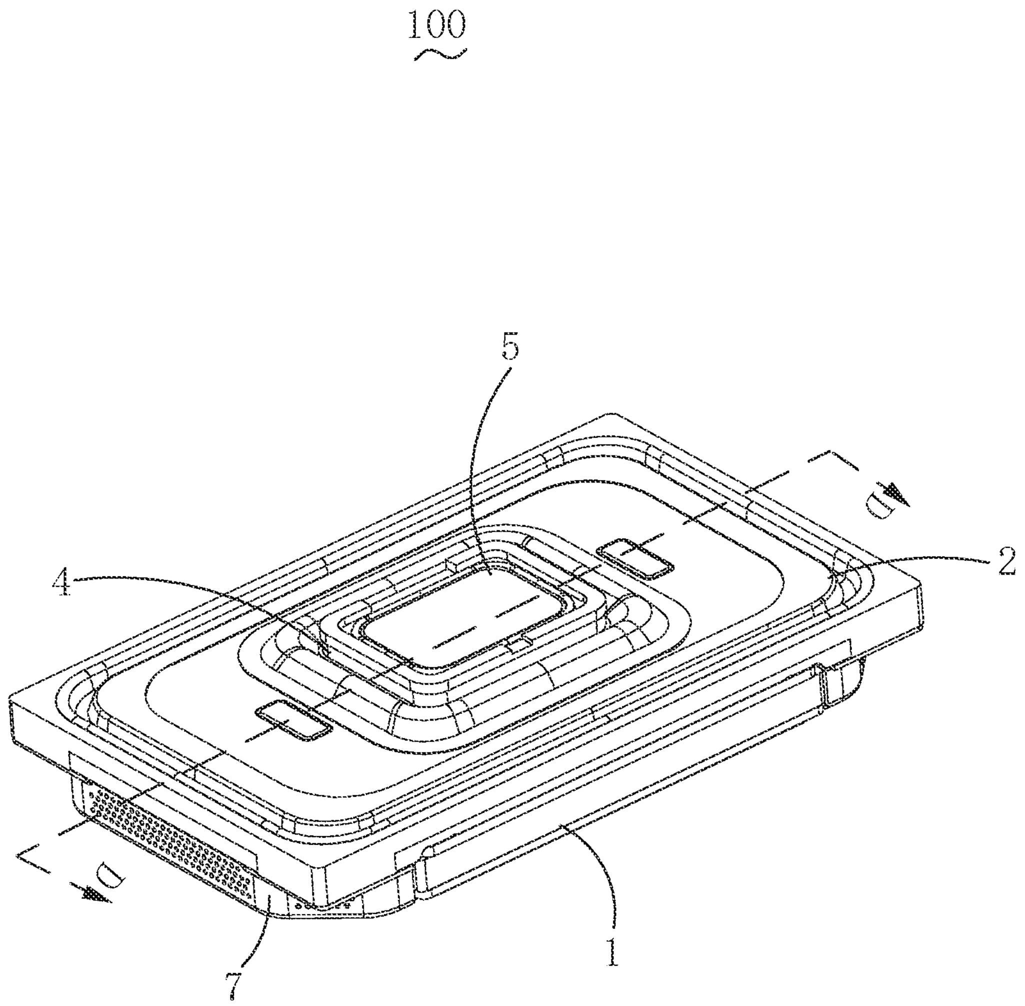
FIG. 7 shows a three-dimensional structural diagram of the speaker device according to Embodiment Two of the present application.
Figure 8:
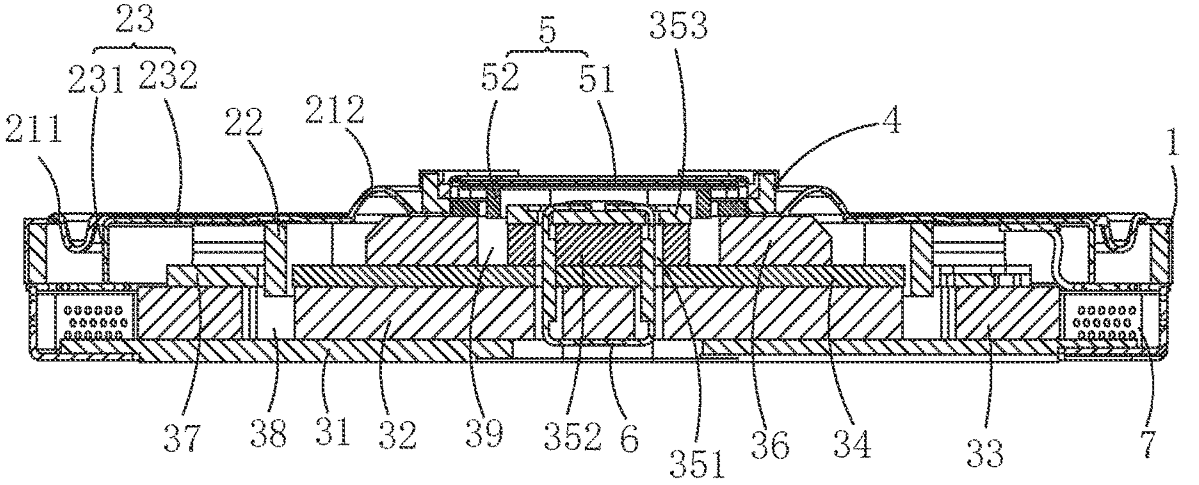
FIG. 8 shows a sectional view of line D-D in FIG. 7.
Figure 9:
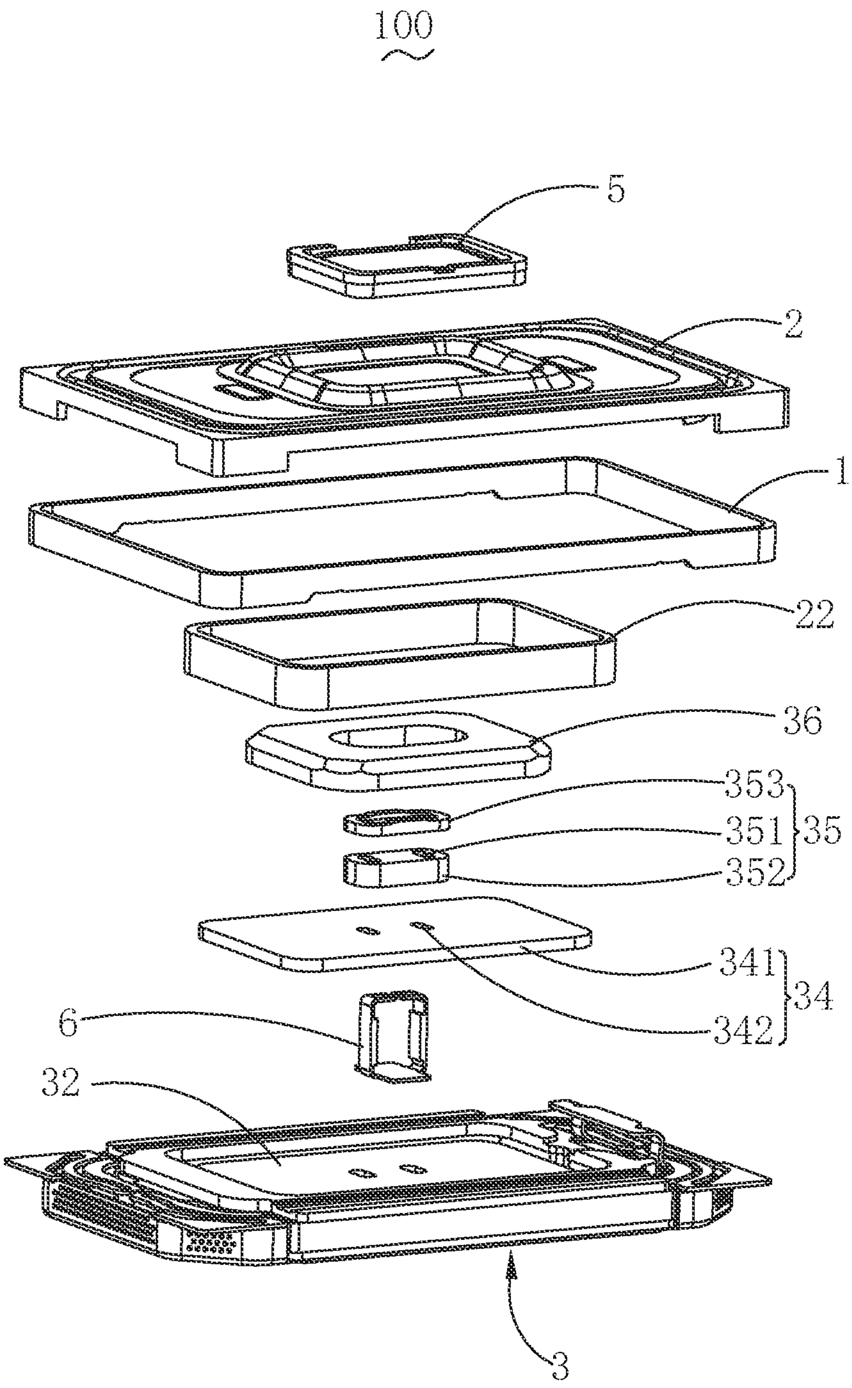
FIG. 9 shows an exploded view of the speaker device according to Embodiment Two of the present application.

Combined with FIGS. 1 to 9, the points of difference between Embodiment Two and Embodiment One is that the structure and setting position of the magnet portion 35 and the first pole core 34 are different, while the rest of the portions have the same structure, realize the same principle, and produce the same technical effect.

In this embodiment, the first pole core 34 includes a first pole core body 341 fixedly stacked on the first main magnetic steel 32 and two third through-holes 342 arranged through the first pole core body 341.

The magnet portion 35 is fixedly stacked on the first pole core body 341, and the magnet portion 35 is provided with two fourth through-holes 351, and the two fourth through-holes 351 are arranged through the magnet portion 35. The two fourth through-holes 351 are in communication with the two third through-holes 342, respectively. The two third through-holes 342 are in communication with the two second through-holes 321, respectively.

In an embodiment, the two fourth through-holes 351 are each provided orthogonally to the two third through-holes 342, and the two second through-holes 321 are each provided orthogonally to the two fourth through-holes 351. The orthogonal projections of the two second through-holes 321, the two third through-holes 342, and the two fourth through-holes 351 along a vibration direction of the second diaphragm 51 toward the lower splint 31 are all located entirely within the first through-hole 311.

In this embodiment, the magnet portion 35 includes a second main magnetic steel 352 fixedly stacked on the first pole core body 341 and a second pole core 353 fixedly stacked on the second main magnetic steel 352. The two fourth through-holes 351 are arranged through the second pole core 353 and the second main magnetic steel 352 in sequence.

Embodiment Three

Figure 10:
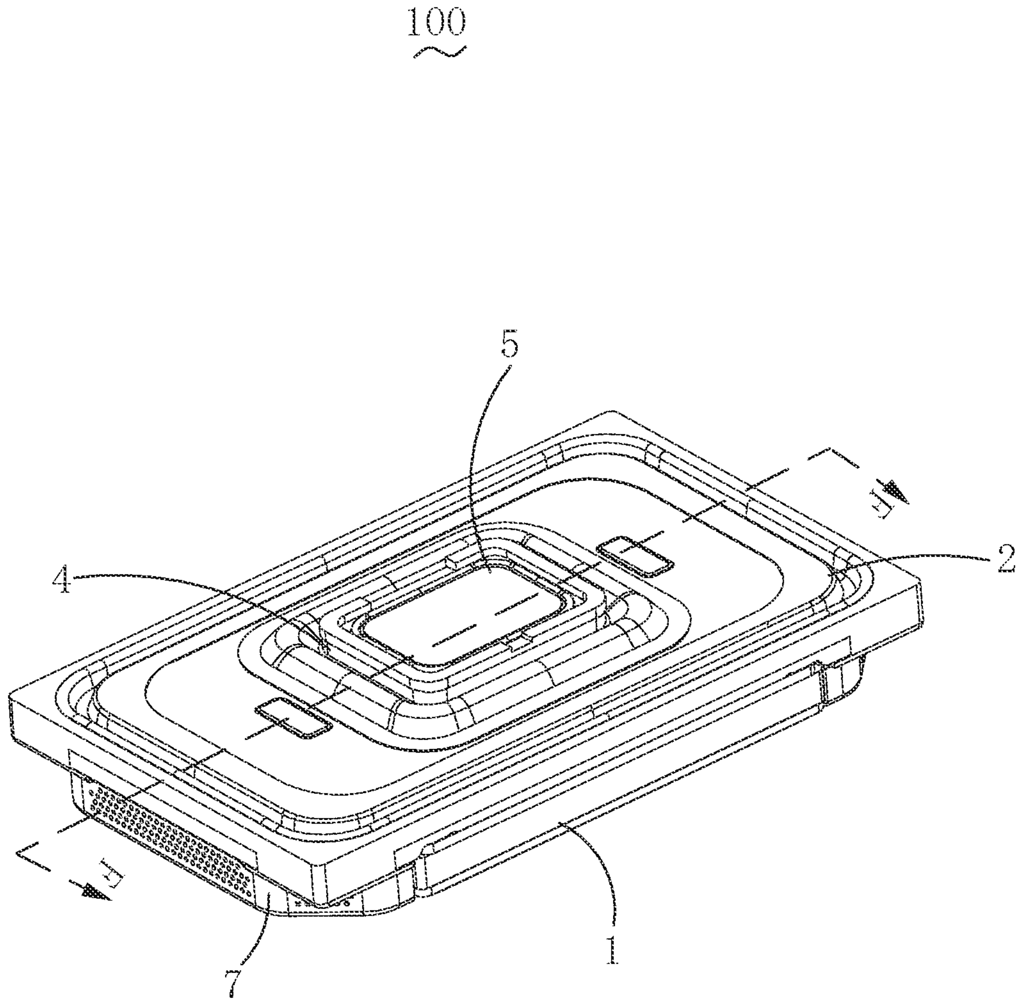
FIG. 10 shows a three-dimensional structural diagram of the speaker device according to Embodiment Three of the present application.
Figure 11:
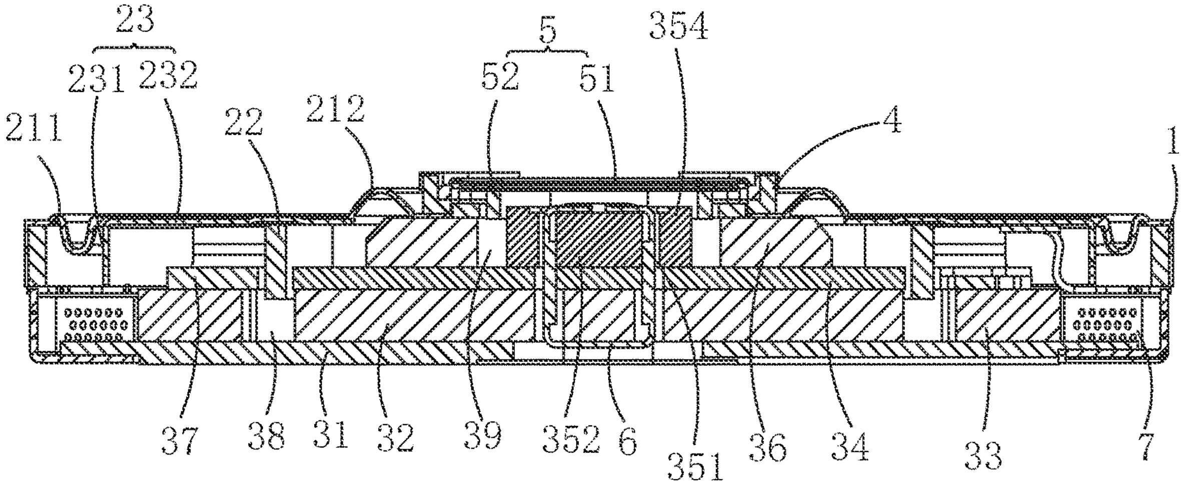
FIG. 11 shows a sectional view of line F-F in FIG. 10.

Combined with FIGS. 1 to 11, the point of difference between Embodiment Three and Embodiment Two is that the structure of the magnet portion 35 is different, and the rest of the portion has the same structure, realizes the same principle, and produces the same technical effect.

In this embodiment, the magnet portion 35 includes an iron core 354 fixedly stacked on the first pole core body 341, and the fourth through-holes 351 are arranged through the iron core 354.

Compared with the related art, in the speaker device of the present application, the lower splint of the magnetic circuit system is equipped with a first through-hole; two second through-holes are arranged through the first main magnetic steel. The first pole core includes a first core body fixedly stacked on the first main magnetic steel and a third through-hole arranged through the first core body, in which the two second through-holes are located in the third through-hole. Two fourth through-holes are arranged through the magnet portion, and the two fourth through-holes are connected to the two second through-holes, respectively. The upper splint is fixedly stacked on the first sub-magnetic steel and fixedly connected to the first frame. The conductive member includes an external conductive disk abutted against the bottom of the first main magnetic steel, two extension walls extended from opposite ends of the external conductive disk and passed through the two second through-holes, the first pole core, and the magnet portion in sequence, and two connecting walls formed by bending and extending the two extension walls; wherein the two connecting walls are used to act as welding pads, and a positive terminal and a negative terminal of the second voice coil are electrically connected to the two connecting walls, respectively. Therefore, the conductive member can pass through the first through-hole, the second through-holes, the first pole core, and the magnet portion from the bottom of the magnetic circuit system to reach the underside of the second diaphragm used for generating high-frequency sounds, realizing the purpose of power supply for the second voice coil, and efficiently adjusting a winding process of the second voice coil for controlling the total extension length of the voice coil wires at the two ends, so as to achieve amplitude adjustment of the second amplitude adjustment of the vibration system. Besides, although the conductive member is also extended from the bottom of the magnetic circuit system towards the top, a middle portion of the first main magnetic steel does not have to be hollowed out as a whole to give way to the conductive member, but rather through the arrangement of the two second through-holes to enable the conductive member to pass through, so that the first main magnetic steel is partially retained between the second through-holes, and the size of the volume of the first main magnetic steel is increased as much as possible, thereby effectively improving the magnetic potential of the magnetic circuit system. Besides, the magnet portion is a whole without having to be hollowed out, and the conductive member is arranged through the magnet portion, the loss of magnetic lines of force is reduced to a great extent, thus jointly making the acoustic performance of the speaker device better.

Described above are only some embodiments of the present application, and it should be noted herein that improvements may be made by those of ordinary skill in the art without departing from the inventive conception of the present application, but all of these fall within the protection scope of the present application.

What is claimed is:

1. A speaker device, comprising:

a first frame;

a first vibration system, comprising:

a first diaphragm fixed at its outer periphery to the first frame; and a first voice coil configured to drive the first diaphragm to vibrate for sound production;

a magnetic circuit system, fixed to the first frame, wherein a side of which close to the first vibration system is provided with a first magnetic gap and a second magnetic gap; the first magnetic is arranged around the second magnetic gap, and the first voice coil is inserted and suspended in the first magnetic gap;

a second frame, fixed to a top of the magnetic circuit system;

a second vibration system, comprising:

a second diaphragm fixed at its outer periphery to a side of the second frame away from the magnetic circuit system; and a second voice coil configured to drive the second diaphragm to vibrate for sound production, which is inserted and suspended in the second magnetic gap;

a conductive member, extended from a bottom of the magnetic circuit system through the magnetic circuit system toward a bottom of the second diaphragm, and electrically connected to the second voice coil;

wherein the magnetic circuit system comprises:

a lower splint, provided with a first through-hole, wherein the first through-hole is arranged through the lower splint;

a first main magnetic steel, fixedly stacked on the lower splint, and provided with two second through-holes, wherein the two second through-holes are both arranged through the first main magnetic steel;

a first sub-magnetic steel, fixedly stacked on the lower splint, wherein the first sub-magnetic steel is arranged around the first main magnetic steel and spaced apart from the first main magnetic steel to form the first magnetic gap;

a first pole core, fixedly stacked on the first main magnetic steel;

a magnet portion, fixedly stacked on the first pole core or the first main magnetic steel; wherein the conductive member is connected to the second voice coil through the first pole core and the magnet portion;

a second sub-magnetic steel, fixedly stacked on the first pole core, wherein the second sub-magnetic steel is arranged around the magnet portion and spaced apart from the magnet portion to form the second magnetic gap; the second frame is fixedly supported on a top of the second sub-magnetic steel; and an upper splint, fixedly stacked on the first sub-magnetic steel and fixedly connected to the first frame;

wherein the conductive member comprises: an external conductive disk abutted against a bottom of the first main magnetic steel, two extension walls extended from opposite ends of the external conductive disk and passed through the two second through-holes, the first pole core, and the magnet portion in sequence, and two connecting walls formed by bending and extending the two extension walls; wherein the two connecting walls are used to act as welding pads, and a positive terminal and a negative terminal of the second voice coil are electrically connected to the two connecting walls, respectively.

2. The speaker device of claim 1, wherein the first pole core comprises a first pole core body fixedly stacked on the first main magnetic steel and a third through-hole arranged through the first pole core, wherein the two second through-holes are located within the third through-hole;

the magnet portion is provided with two fourth through-holes, wherein the two fourth through-holes are arranged through the magnet portion, and the two fourth through-holes are connected to the two second through-holes, respectively;

the magnet portion comprises a second main magnetic steel and a second pole core fixedly stacked on the second main magnetic steel; wherein the second main magnetic steel is located in the third through-hole and fixedly stacked on a side of the first main magnetic steel close to the second vibration system, and the two fourth through-holes are arranged through the second pole core and the second main magnetic steel in sequence.

3. The speaker device of claim 1, wherein the first pole core comprises a first pole core body fixedly stacked on the first main magnetic steel and two third through-holes arranged through the first pole core body;

the magnet portion is fixedly stacked on the first pole core body, the magnet portion is provided with two fourth through-holes, wherein the two fourth through-holes are arranged through the magnet portion; the two fourth through-holes are connected to the two third through-holes, respectively; and the two third through-holes are connected to the two second through-holes, respectively;

the two fourth through-holes are arranged orthogonally to the two third through-holes, respectively; and the two second through-holes are arranged orthogonally to the two fourth through-holes, respectively; the orthogonal projections of the two second through-holes, the two third through-holes, and the two fourth through-holes along a vibration direction of the second diaphragm toward the lower splint are all located entirely within the first through-hole.

4. The speaker device of claim 3, wherein the magnet portion comprises a second main magnetic steel fixedly stacked on the first pole core body and a second pole core fixedly stacked on the second main magnetic steel; and the two fourth through-holes are arranged through the second pole core and the second main magnetic steel in sequence.

5. The speaker device of claim 3, wherein the magnet portion comprises an iron core fixedly stacked on the first pole core body, wherein the fourth through-hole are arranged through the iron core.

6. The speaker device of claim 1, wherein the first diaphragm comprises:

a first folding ring in the shape of an annulus;

a second folding ring in the shape of an annulus, which is spaced apart from the first folding ring and arranged on an inner side of the first folding ring; and a first vibration portion in the shape of an annulus, which is formed by bending and extending an inner periphery of the first folding ring to connect to an outer periphery of the second folding ring;

wherein an outer periphery of the first folding ring is fixed to the first frame; an inner periphery of the second folding ring is fixed to a side of the second sub-magnetic steel away from the first main magnetic steel; and the first voice coil is fixed to a side of the first vibration portion close to the magnetic circuit system; the inner periphery of the second folding ring is fixed between the second frame and the second sub-magnetic steel.

7. The speaker device of claim 6, wherein the first vibration system further comprises a first skeleton and an elastic support assembly, wherein the first skeleton comprises a skeleton body in the shape of an annulus for acting as the first vibration portion and a skeleton connecting portion formed by downwardly bent and extended from an outer periphery of the skeleton body; wherein one end of the elastic support assembly is fixed to the first frame, and the other end of the elastic support assembly is fixed to the skeleton connecting portion.

8. The sounding device of claim 7, wherein the elastic support assembly comprises a first fixing arm fixed to the first frame, a second fixing arm spaced opposite the first fixing arm, and a spring arm connecting the first fixing arm to the second fixing arm, wherein the second fixing arm is fixed to the skeleton connecting portion.

9. The speaker device of claim 1, wherein the second diaphragm comprises a second vibration portion, a third folded ring formed by extending outwardly from an outer periphery of the second vibration portion and in the shape of an annulus, and a dome covered on the second vibration portion, wherein an outer periphery of the third folded ring is fixed to a side of the second frame away from the second sub-magnetic steel, and the second voice coil is fixed to the second vibration portion.

10. The speaker device of claim 9, wherein the second diaphragm further comprises an auxiliary dome in the shape of an annulus and fixed to a side of the second vibration portion close to the magnetic circuit system; wherein the auxiliary dome is located on a side of the second vibration portion away from the magnetic circuit system, and the second voice coil is fixed to a side of the auxiliary dome close to the magnetic circuit system.

* * * * *